Figure 1:
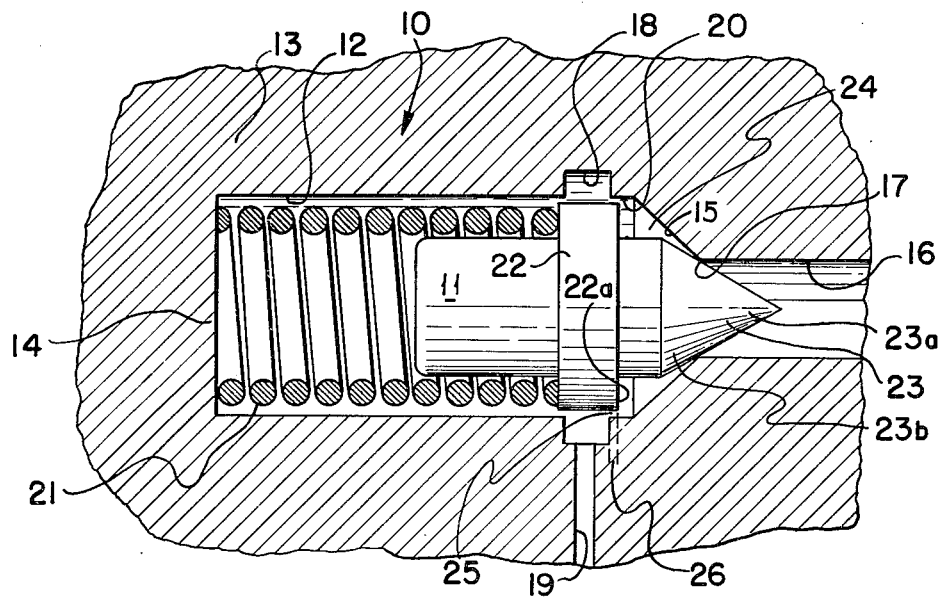

Aug. 10, 1965    R. E. TRICK    3,199,532

VELOCITY COMPENSATED POPPET VALVE

Filed Dec. 26, 1962

INVENTOR
ROBERT E. TRICK
BY *Mason, Kolehmainen,
Rathburn & Wyss*
ATTORNEYS 3,199,532
VELOCITY COMPENSATED POPPET VALVE
Robert E. Trick, Racine, Wis., assignor to Webster Electric
Company, Racine, Wis., a corporation of Delaware
Filed Dec. 26, 1962, Ser. No. 247,233
9 Claims. (Cl. 137—469)

The present invention relates generally to poppet valves and is more specifically concerned with a simple, spring loaded poppet valve possessing operating characteristics which have heretofore been possible only with complicated and much more expensive valve systems.

Spring loaded poppet valves of the type used prior to the present invention are so constructed that they open at a predetermined pressure and at a relatively low flow rate, for example, when the pump used in the system is running at low or intermediate speeds. It would be desirable that the valve open at this same pressure when the flow rate is very high as, for example, when the pump speed is increased. However, prior poppet valves possess the undesirable characteristic that greater pressure is required to open them when the flow rate is high. This undesirable effect can be attributed first to the spring rate of the loading spring since the poppet valve must open relatively far to accommodate a large flow and, as a result, the spring is already compressed so that a greater pressure is required to overcome the spring in order to open the poppet any further. Second, the orifice produced by unseating the poppet causes a large conversion of pressure head to velocity head thus decreasing the total force exerted on the poppet and increasing the pressure required for further opening. This problem has been solved prior to the present invention only be resort to control systems using a pilot operated type relief valve but such systems are complex, expensive, heavy and space consuming.

It is, therefore, a primary object of the present invention to provide a simple, spring loaded poppet valve possessing the desired operating characteristics of the more complicated systems referred to above.

Another object of the invention is to provide a small, inexpensive poppet valve having a substantially flat pressure versus flow characteristic so that the valve will open at substantially the same pressure irrespective of the rate of flow.

A further object of the invention is to provide a spring loaded poppet valve having operating characteristics such that it affords satisfactory system relief at all flow rates.

The foregoing and other objects are realized, in accordance with the present invention, by providing a spring loaded poppet valve mounted within a valve bore and having a conical end portion seating against a valve seat in an inlet. When the poppet is unseated in response to pressure of fluid in the inlet the conical end cooperates with the valve seat to form a primary regulating orifice through which fluid flows to a chamber formed between the valve bore and an annular collar on the poppet at a position spaced from the conical end portion. Fluid passes from the latter chamber through an annular clearance between the collar and the valve bore and then flows to an annular groove in the valve body leading to an outlet. The annular clearance provides an auxiliary, velocity compensated orifice for handling the flow passing through the primary orifice. The pressure in the valve chamber is intermediate that of the inlet and the outlet and it acts upon one face of the annular collar and upon a portion of the conical end of the poppet to control the poppet opening in cooperation with the primary orifice. By suitable selection of such factors as the cone angle of the end portion of the poppet, the annular clearance between the collar and the valve bore and the like it has been found possible to control the characteristic pressure behavior of the valve so that it opens at the same pressure despite increasing flow rate or, at the very least, possesses such a slight rise in its pressure versus flow characteristic that the effects are inconsequential upon system operation. It is also possible with the present invention to provide a valve which opens at a given pressure but is effective to relieve at a lower pressure if the flow rate increases following the initial opening.

Figure 2:
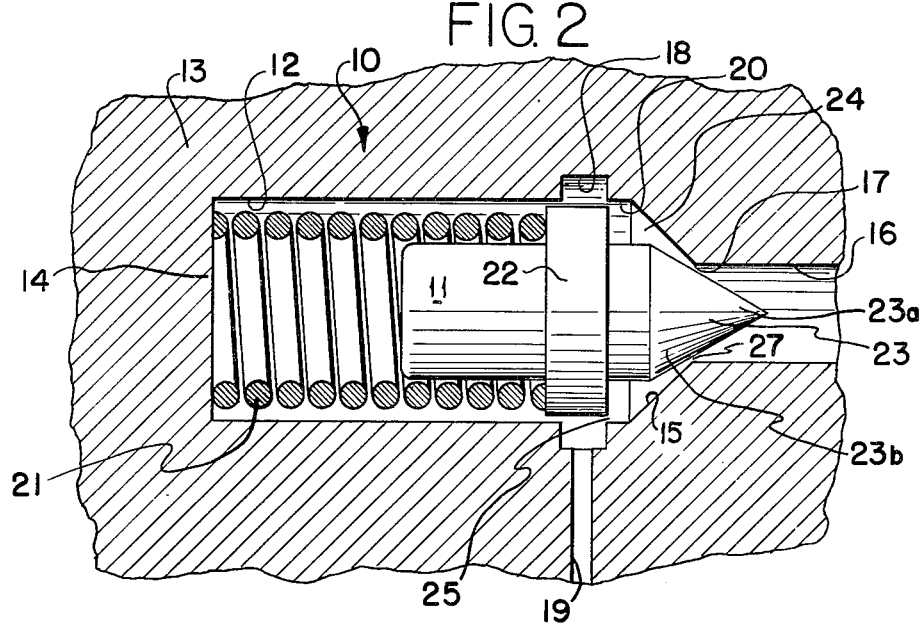

The invention, both as to its organization and manner of operation, together with further objects and advantages will best be understood from the following detailed description considered in conjunction with the accompanying drawing wherein:

FIG. 1 is a fragmentary sectional view showing a poppet valve characterized by the features of the present invention; and FIG. 2 is a view similar to FIG. 1 but shows the poppet valve in an open position.

Referring now to the drawing, a poppet valve 10 is there shown as comprising a poppet 11 mounted within an open ended valve bore 12 formed in a valve body 13. One end 14 of the valve bore is suitably closed as, for example, by a blind end or by a cap or plug. The inner end of the valve bore is tapered inwardly as indicated at 15 to join with an inlet passage 16 to form an annular valve seat 17. The inlet 16 is connected to receive fluid from a suitable source such as a pump (not shown). An annular groove 18 formed in the valve body 13 extends around the valve bore 12 at a position spaced from the valve seat and is connected directly to an outlet passage 19 leading to a tank or reservoir. A short annular region 20 of the valve bore is formed between the groove 18 and the tapered end 15.

To bias the poppet 11 towards the valve seat 17 there is provided a coil spring 21 which has one end seated against the cap 14 and has its other end encircling the body of the poppet. The inner end of the spring 21 seats against an annular collar 22 formed on the poppet. The poppet further includes a conical end portion 23 extending into the inlet passage 16 and cooperating with the valve seat 17 to form a seal normally preventing the flow of fluid from the inlet to the outlet passage 19. The conical end portion 23 is spaced from the annular collar 22 and cooperates with the collar and with the regions 15 and 20 of the valve bore to form a valve chamber 24 intermediate the inlet and outlet passages.

The outer diameter of the annular collar 22 is slightly less than the diameter of the valve bore in the region 20 so as to provide a small annular clearance 25 between the poppet and the valve bore. The chamber 24 is thus bounded on its inlet side by the seal between the valve seat 17 and the conical end of the poppet and is connected at its outlet side to the outlet passage 19 and groove 18 through the annular clearance 25. When the poppet 11 is seated as shown in FIG. 1 a portion of the annular collar 22 overlaps the region 20 in the area indicated by the reference numeral 26.

When the pressure of the fluid in the inlet passage 16 becomes sufficient to exert a total force on the extreme lower end 23a of the conical end of the poppet sufficient to overcome the spring 21, the poppet is moved towards the position shown in FIG. 2 so that the excess flow passes from the inlet passage and into the chamber 24 through a primary regulating orifice 27 formed between the valve seat 17 and the conical end 23. This excess fluid passes from the chamber 24 through the annular clearance 25 to the groove 18 and the outlet passage 19. Thus, as soon as the poppet is unseated the area 22a of the inner face of the collar 22 and the upper portion 23b of the conical end 23 of the poppet are exposed to the pressure of the fluid in the chamber 24 which pressure is, of course, less than the inlet pressure in the passage 16 by the pressure drop across the orifice 27 but is greater than the tank pressure in the outlet passage 18 by the pressure drop across the annular clearance 25. At low flow rates, the annular clearance 25 is considerably larger than the primary regulating orifice 27 and, as a result, most of the inlet pressure is dropped across the primary orifice 27. As the flow rate increases the primary orifice becomes larger and the pressure in the chamber 24 becomes greater with the result that the latter pressure acting on the face 22a and the portion 23b tends to move the poppet 11 away from the seat. At this point the pressure drop across the annular clearance or velocity compensating orifice becomes influential in determining the stroke of the poppet. Thus, as the flow through the velocity compensating orifice increases the pressure in the chamber 24 increases and the poppet is further unseated even though the pressure in the inlet passage 16 does not increase substantially. As the poppet unseats the velocity compensating orifice assumes greater control over the stroke until the annular collar 22 reaches a point where its inner end is near or slightly beyond the area 26. The point where this condition is reached is thus determined by the length of the overlap area 26 between the annular collar and the region 20. When the point is reached the velocity compensating orifice 25 becomes a pressure regulating orifice so that any increase in pressure of the inlet fluid causes the poppet to unseat further to increase the size of the orifice 25. The pressure drop across the latter orifice is thus decreased so that the primary regulating orifice 27 retains primary control over the poppet stroke thus preventing instability of the valve operation and undesirable unloading of the inlet fluid which would occur if the velocity compensating orifice 25 were to assume the principal control. More specifically, if the flow through the orifice 25 were to become the principal control factor it is conceivable that an increase in flow rate accompanied by a decrease in inlet pressure would cause the poppet to unseat even further to unload the inlet fluid despite the fact the drop in pressure would make it desirable that the poppet move towards its seat. The valve of the present invention avoids this possibility by preventing the orifice 25 from taking control even if the flow rate becomes very high. As was indicated above, this is accomplished by increasing the size of the velocity compensating orifice at these very high flow rates.

It should also be recognized that the clearance 25 between the periphery of the collar 22 and the region 20 of the valve bore plays an important part in determining the operating characteristic of the valve 10. Thus, if this clearance is very small to permit little or no leakage, the poppet 11, when unseated, moves immediately to the point where the overlap 26 becomes negative, that is, the inner edge of the collar 22 is to the left of or beyond the annulus at the right edge of the groove 18 as viewed in FIGS. 1 and 2. When this occurs the poppet regulates like a piston valve at the orifice between the collar 22 and the groove 18 so that the flow is throttled to the tank. Thus, this small clearance would not be effective to provide velocity compensation in the manner described above and, for this reason, is not a desirable construction. If, on the other hand, the clearance 25 is very large the effect of the velocity compensated orifice is lost because the flow past the collar 22 can handle the excess flow through the primary orifice 27 with an insignificant change in pressure.

As will be apparent from the foregoing description the pressure versus flow characteristic of the valve 10, that is the curve of the inlet pressure plotted as a function of flow rate, is determined by several factors among which are (a) the cone angle of the end portion 23 of the poppet which determines the rate of increase of the primary orifice 27 as the poppet is moved, (b) the clearance between the collar 22 and the region 20 of the valve bore and (c) the length of the overlap 26. It has actually been found possible by adjusting these factors to control the pressure characteristic of the valve so that instead of the relatively large rise in pressure with flow as is normally experienced in poppet valves, the pressure can be made to drop with flow. However, the dropping pressure characteristic is limited to the point where the valve becomes unstable and noisy in the manner described above. Even with the latter limitation in mind it is possible to adjust the control factors so that a flat pressure versus flow characteristic is obtained or to so limit the rise in this characteristic that its effect on system operation is inconsequential. Thus, it will be observed that the valve 10 is effective to accomplish all of the enumerated objects of the invention. The valve is simple, inexpensive, very small and light in weight but, at the same time, is effective to achieve all of the results which have heretofore required use of much more complex structures.

While a particular embodiment of the invention has been illustrated and described it will be apparent that many changes and modifications will readily occur to those skilled in this art and it is, therefore, intended in the appended claims to cover any such changes and modifications that fall within the true spirit and scope of the invention.

What is claimed as new and is desired to be secured by Letters Patent of the United States is:

1. A poppet valve comprising means defining a valve chamber having a valve seat, an inlet connected to said valve seat, a poppet in said chamber having a tapered valve portion, means acting against said poppet to urge said poppet towards a closed position wherein said valve portion is seated against said seat, the pressure of fluid in said inlet acting against said poppet to move said valve portion away from said seat towards an open position when said pressure exceeds a predetermined value, thereby forming a primary orifice between said seat and said valve portion, said poppet being movable through a predetermined normal range extending from the closed position towards the open position, the length of said tapered portion being such that at least some of said tapered portion extends beyond said seat and into said inlet when the poppet is in the open position, an outlet from said chamber spaced from said valve seat, said poppet including means cooperating with said valve chamber and said valve portion to form a regulating chamber intermediate said inlet and said outlet for receiving fluid from said primary orifice, means defining a secondary orifice for delivering fluid from said chamber to said outlet, said secondary orifice defining means being so constructed and arranged that the size of said secondary orifice remains constant as said poppet moves through said range and is greater than that of said primary orifice, whereby the primary orifice at all times exercises primary control over the movement of the poppet through said range, the pressure of the fluid in the regulating chamber being effective to act upon said poppet to move it as a function of the flow through the secondary orifice in order to compensate for increasing flow rates between the inlet and outlet.

2. The apparatus defined by claim 1 further including means for providing an increased flow of fluid from said chamber to said outlet in the event that said poppet moves beyond said range.

3. A poppet valve comprising means defining a valve chamber having a valve seat, an inlet connected to said valve seat, a poppet in said chamber having a tapered valve portion, a spring acting against said poppet to urge said poppet towards a closed position with said valve portion seated against said seat, the presure of fluid in said inlet acting against said poppet to move said valve portion away from said seat and towards an open position when said pressure exceeds a predetermined value, thereby forming a primary orifice between said seat and said valve portion, said poppet being movable through a predetermined range extending from the closed position to an open position, the length of said tapered portion being such that at least some of said tapered portion extends beyond said seat and into said inlet when the poppet is in the open position, thereby to restrict the size of said primary orifice throughout said range, an outlet from said chamber spaced from said valve seat, said poppet including means cooperating with said valve chamber and said valve portion to form a regulating chamber intermediate said inlet and said outlet for receiving fluid from said primary orifice, means defining a secondary orifice for delivering fluid from said chamber to said outlet, said secondary orifice defining means being so constructed and arranged that the size of said secondary orifice remains constant as said poppet moves through said range while the taper on said valve portion is such that the size of said secondary orifice while said poppet moves through said range is greater than that of said primary orifice, whereby the primary orifice at all times exercises primary control over the movement of the poppet through said range with the pressure of the fluid in said regulating chamber being intermediate the pressure of the fluid in the inlet and the pressure of the fluid in the outlet, the pressure of the fluid in the regulating chamber being effective to act upon said poppet to assist in moving it through said range as a function of the flow through the secondary orifice in order to compensate for increasing flow rates between the inlet and outlet, the latter pressure being effective in the event that it increases above a predetermined level to move said poppet beyond said range, said secondary orifice defining means being so constructed and arranged that the size of said secondary orifice increases as said poppet is moved beyond said range, whereby the pressure drop across the secondary orifice is decreased and the primary orifice retains control of the poppet movement.

4. A poppet valve comprising a valve body having a bore therein and an annular groove opening to said bore, an outlet connected to said groove, means forming an inlet having an annular valve seat communicating with one end of said bore, said groove being spaced from said one end and said bore including an annular, longitudinally extending region lying adjacent said groove and intermediate the groove and said bore end, a poppet having a cylindrical stem with a valve portion tapering inwardly from said stem towards the longitudinal axis of the stem, said valve portion normally engaging said seat to form a seal for preventing fluid flow from the inlet to the outlet, and the tapered valve portion being of such length that it extends well beyond said seat and into said inlet when said seal is formed, a spring biasing said poppet towards a closed position with said valve portion engaging said seat, said poppet being movable towards an open position and away from said valve seat against said spring in response to excess pressure in said inlet, thereby to form between said seat and said valve portion a primary valve orifice which increases gradually in size as said valve portion moves away from said seat, the tapered valve portion being of such length that it extends beyond said valve seat and into the inlet even when the poppet is in its fully open position, thereby to limit the size of the primary orifice even with the valve fully open, means forming an annular area on said poppet stem having a diameter greater than the maximum diameter of the conical end but somewhat smaller than the diameter of said annular region, said annular area extending longitudinally of said poppet and overlapping the annular region of said valve bore in a direction extending longitudinally of the bore towards said valve seat and adjacent said annular groove when said valve portion is seated against said valve seat, said valve bore cooperating with said annular area forming means on said poppet to form a valve chamber around said valve stem and between the valve seat and said annular area forming means, said valve chamber receiving fluid from said inlet when said valve portion of said poppet is moved away from said valve seat, said annular area and said annular region cooperating to form an elongated annular secondary regulating orifice leading from said valve chamber to said annular groove for passing fluid from the valve chamber to the outlet when the poppet is unseated and throughout the period of movement of said annular area through the overlap with said region, said secondary regulating orifice having an area larger than that of said primary orifice even when said annular area reaches the end of said overlap region, said tapered valve portion being of such length that it extends beyond the valve seat and into the inlet even when said annular area reaches the end of said overlap region, the flow through said secondary regulating orifice creating a pressure drop so that the pressure of the fluid in said valve chamber is greater than that in the outlet, the pressure in said chamber acting upon said poppet to move it as a function of the flow through said secondary regulating orifice thereby to compensate for increasing flow rates.

5. The poppet valve defined by claim 4 wherein the secondary orifice increases in size to deliver additional fluid to said outlet if the pressure in said chamber becomes sufficient to move said annular area beyond the end of said overlap region.

6. The poppet valve defined by claim 5 wherein said annular area is in the form of a right cylinder coaxial with said stem and having a flat base portion facing in the direction of the valve seat and extending from the periphery of the annular area towards said stem.

7. The poppet valve defined by claim 4 wherein said annular area is in the form of a right cylinder coaxial with said stem and having a flat base portion facing in the direction of the valve seat and extending from the periphery of the annular area towards said stem.

8. The poppet valve defined by claim 7 wherein said valve portion is in the form of a cone having a substantially pointed end.

9. The poppet valve defined by claim 4 wherein said valve portion is in the form of a cone having a substantially pointed end.

References Cited by the Examiner

UNITED STATES PATENTS

| | | | |
|---|---|---|---|
| 1,029,464 | 6/12 | Ruwell | 137—540 XR |
| 1,322,938 | 11/19 | Parker | 137—540 XR |
| 2,279,002 | 4/42 | MacNeil | 137—540 |

FOREIGN PATENTS

| | | |
|---|---|---|
| 686,588 | 7/30 | France. |
| 1,087,463 | 2/55 | France. |

ISADOR WEIL, *Primary Examiner.*